No. 748,785. PATENTED JAN. 5, 1904.
E. PIERSON.
DISK SHARPENER.
APPLICATION FILED SEPT. 1, 1903.
NO MODEL.

Witnesses
C. H. Walker
Geo. E. Tew

Inventor
Edward Pierson
by Milo B. Stevens & Co
Attorneys

No. 748,785. Patented January 5, 1904.

UNITED STATES PATENT OFFICE.

EDWARD PIERSON, OF MILAN, KANSAS.

DISK-SHARPENER.

SPECIFICATION forming part of Letters Patent No. 748,785, dated January 5, 1904.

Application filed September 1, 1903. Serial No. 171,523. (No model.)

*To all whom it may concern:*

Be it known that I, EDWARD PIERSON, a citizen of the United States, residing at Milan, in the county of Sumner and State of Kansas, have invented new and useful Improvements in Disk-Sharpeners, of which the following is a specification.

This invention comprises a device adapted to hold the disks of plows, harrows, and the like while they are being sharpened by hammering the edge thereof upon an anvil; and it consists of a holder adapted to be attached to an anvil to support disks of various sizes in proper position to rest their edges on the anvil where they may be hammered to the right bevel. To this end I provide a support attachable to an anvil and containing a hinged joint adjustable to get the proper bevel on the disk as it rests upon the anvil and also having a sliding section extensible to accommodate disks of various sizes.

Figure 1:
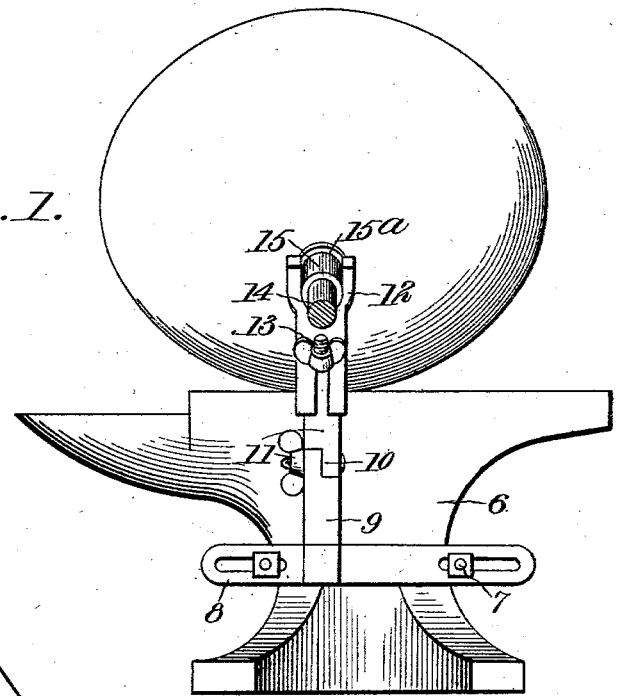
Figure 2:
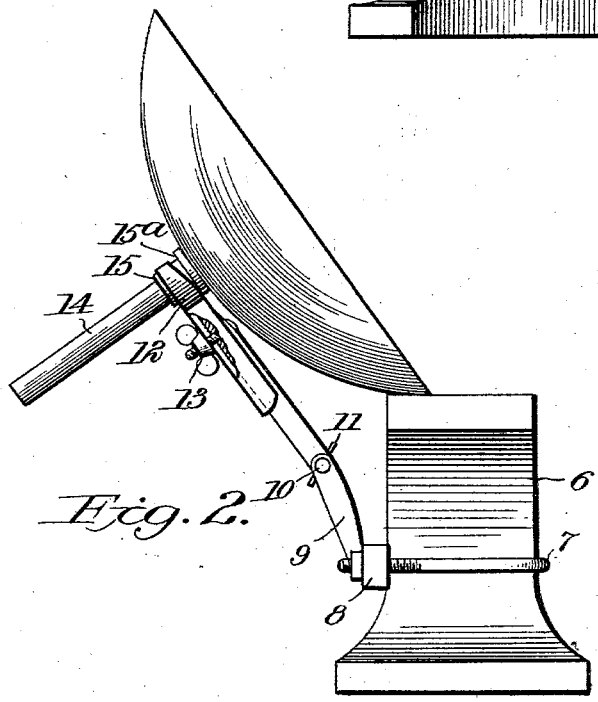
Figure 3:
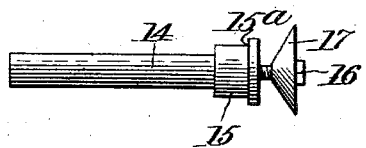

In the accompanying drawings, Figure 1 is a side view of an anvil with the device attached. Fig. 2 is an edge view thereof with a handle to a disk held thereby in position on the anvil, and Fig. 3 is an edge view of the handle attached.

Referring specifically to the drawings, the anvil is indicated at 6, to which the device is attached by a U-bolt 7, engaging the bottom bar 8 of the disk-holder. From this bar a standard 9 projects, formed in two sections, hinged together at 10, the hinge-bolt having a thumb-nut 11, whereby the sections may be clamped in adjusted position. The proper bevel of the disk is got by adjustment of this joint. The standard is inclined outwardly or away from the anvil, as shown in Fig. 2, to hold the disk at a proper inclination. To the top of the standard a forked piece 12 is secured by bolt and thumb-nut 13. The stem of the forked piece is slotted, and the bolt extends through the slot and through a hole in the top of the standard. The slot permits the fork to be raised or lowered by loosening the thumb-nut, whereby the device may be adjusted to suit disks of various diameters.

To permit convenient manipulation of the disk and to provide means whereby it may be held upon the holder described, a handle 14 is provided. This handle is made of wood, so as to be non-conducting, and has at the end a metal ferrule 15. The handle is bored at the ferrule end to receive a bolt 16, which carries under the head thereof a bevel-washer 17, the bevel of which is proper to fit the inner face of the disk to hold the same firmly.

In use the convex side of the disk is placed against the ferrule on the wooden handle, and the bolt is put through the center hole of the disk and screwed into the handle. Then the support being in position in the fork with the arms of the latter fitting behind and against the shoulder 15ª of the furrule, the proper adjustment of the joints is effected to bring the edge of the disk upon the face of the anvil and to incline the edge thereto at a proper angle to receive the desired bevel under the hammer.

It will be understood that the disk is heated before it is put on the anvil, and it may be rotated by the handle in the fork to bring its entire edge, or so much thereof as is heated, under the hammer, and it may be carried and reheated by the handle without being detached therefrom.

It will be seen that the attachment requires no special anvil or block, but the face of an ordinary anvil is utilized, and the concave side of the disk is presented to the hammer, so that there is no danger of buckling the same in hammering.

What I claim as new, and desire to secure by Letters Patent, is—

1. The combination with a standard attachable to an anvil, and adjustable angularly and vertically, of a handle rotatably supported at the top of the standard, and means to attach a disk to the handle.

2. The combination with an angularly-adjustable standard attachable to an anvil, and a forked piece extensible upon the upper end of the standard, of a handle rotatable in the fork, and devices to attach a disk to the handle.

In testimony whereof I have signed my name to this specification in the presence of two subscribing witnesses.

EDWARD PIERSON.

Witnesses:
O. W. JULIEN,
C. R. WALKER.